United States Patent
Ruschin

[11] Patent Number: 6,118,119
[45] Date of Patent: Sep. 12, 2000

[54] SPECTRAL ANALYZER WITH WAVELENGTH AND DIRECTION INDICATOR

[76] Inventor: Shlomo Ruschin, A. D. Gordon 44, Herzlia 46433, Israel

[21] Appl. No.: 09/101,031

[22] PCT Filed: Dec. 25, 1996

[86] PCT No.: PCT/IL96/00192
§ 371 Date: Jun. 25, 1998
§ 102(e) Date: Jun. 25, 1998

[87] PCT Pub. No.: WO97/26514
PCT Pub. Date: Jul. 24, 1997

[30] Foreign Application Priority Data

Dec. 27, 1995 [IL] Israel ........................................ 116583

[51] Int. Cl.[7] ....................................................... H01J 3/14
[52] U.S. Cl. ........................................ 250/237 G; 356/305
[58] Field of Search ............................ 250/237 G, 237 R, 250/216; 356/356, 373, 374, 328, 334, 73, 347, 305; 359/558

[56] References Cited

U.S. PATENT DOCUMENTS

| | | | |
|---|---|---|---|
| 4,674,871 | 6/1987 | Shifrin | 356/73 |
| 4,682,888 | 7/1987 | Welner | 356/73 |
| 4,971,442 | 11/1990 | Okutani et al. | 250/237 G |
| 5,043,726 | 8/1991 | Shifrin | 340/953 |

*Primary Examiner*—Que T. Le
*Attorney, Agent, or Firm*—Mark M. Friedman

[57] ABSTRACT

A device for simultaneously determining the direction and wavelength of an incident light beam. The device includes a transparent block and a diffraction grating for diffracting the incident light beam to produce a number of diffracted beams within the transparent block. The device further includes a detector array generating an output indicative of positions of intersection of the diffracted beams. Finally, the device includes a processor for processing the output to determine the direction and wavelength of the incident light beam.

16 Claims, 6 Drawing Sheets

SPECTRAL ANALYZER WITH WAVELENGTH AND DIRECTION INDICATOR

FIELD AND BACKGROUND OF THE INVENTION

The present invention relates to spectral analysis of electromagnetic radiation and, in particular, devices for simultaneously determining the direction and wavelength of an incident monochromatic light beam.

It is known to use dispersive techniques for analyzing electromagnetic radiation. In the context of modern weapons systems, the use of lasers has become widespread. The need to warn vehicle operators and the like of the presence and origin of incident laser radiation has lead to the development of various devices intended to use dispersive techniques to identify incident laser radiation.

U.S. Pat. No. 4,682,888 to Welner discloses a spectral analyzer and direction indicator. The device uses a non-diffracted beam and two detector arrays to determine the direction of incidence of the radiation, and two reflection gratings with a further three detector arrays to provide information for spectral analysis.

U.S. Pat. No. 4,674,871 to Shifrin discloses a spectral analyzer and direction indicator. The device uses two reflection gratings arranged at 90°, each having a lens with a detector array at the focal plane. In order to provide full directional information, a double apparatus with four gratings with their associated optical systems and detector arrays is required. The field of view (FOV) of the device appears to be about 30° wide.

U.S. Pat. No. 5,043,726 to Shifrin discloses a spectral analyzer and direction indicator. The device uses two orthogonally mounted optical channels each having a reflector partially ruled with a diffraction grating. Each channel is provided with an optical system having a detector array at its focal plane. The FOV of the device is about 10°–20° wide.

All of the devices disclosed in these patents share a number of shortcomings. Firstly, each of the devices includes a large number of optical elements which must be maintained in precise geometrical and angular alignment to ensure correct operation. This makes them expensive to produce, oversized, and susceptible to inaccuracies and malfunctioning due to misalignments. Secondly, the design of each of the devices imposes severe geometrical limits on its operative field of view.

There is therefore a need for a spectral analyzer and direction indicator for simultaneously determining the direction and wavelength of an incident light beam which is structurally simple, compact and inexpensive, and which has a wide operational field of view.

SUMMARY OF THE INVENTION

The present invention is of devices for simultaneously determining the direction and wavelength of an incident light beam.

According to the teachings of the present invention there is provided, a device for simultaneously determining the direction and wavelength of an incident light beam, the device comprising: (a) a transparent block having a first face and a second face; (b) a diffraction grating associated with the first face for diffracting the incident light beam to produce a plurality of diffracted beams within the transparent block; (c) a detector array associated with the second face, the detector array generating an output indicative of positions of intersection of the diffracted beams with the second face; and (d) a processor for processing the output to determine the direction and wavelength of the incident light beam.

According to a further feature of the present invention, the transparent block is cuboid, the first face being opposite to the second face.

According to a further feature of the present invention, the detector array is a two-dimensional array, the output being indicative of the positions measured in two-dimensions.

According to a further feature of the present invention, in the case of a two-dimensional array, the diffraction grating includes lines ruled in two directions.

In another form of the present invention, the transparent block has a first dimension parallel to lines of the diffraction grating and a second dimension perpendicular to the lines and parallel to the second face, the detector array being located so as to measure position on the second face along the second dimension, the first dimension being significantly smaller than the second dimension so that the transparent block functions as an optical waveguide with respect to the first dimension.

There is also provided, according to the teachings of the present invention, a system for simultaneously determining the direction and wavelength of an incident light beam, the system comprising: (a) a first device as described; and (b) a second device as described, the first and second devices being positioned such that the first dimension of the transparent block of the second device is rotated by an angle of between about 30° and about 150° from the first dimension of the transparent block of the first device.

According to a further feature of the present invention, the angle is about 90°.

According to a further feature of the present invention, the transparent block is cuboid, the first face being adjacent to the second face.

According to a further feature of the present invention, the transparent block has a first dimension perpendicular to the first face and a second dimension parallel to both the first and the second faces, the detector array being located so as to measure position on the second face along the second dimension, the first dimension being significantly smaller than the second dimension so that the transparent block functions as an optical waveguide with respect to the first dimension for at least one of the diffracted beams.

There is also provided, according to the teachings of the present invention, a system for simultaneously determining the direction and wavelength of an incident light beam, the system comprising: (a) a first device constructed as described; and (b) a second device constructed as described, the first and second devices being positioned such that the first dimension of the transparent block of the second device is rotated by an angle of between about 30° and about 150° from the first dimension of the transparent block of the first device.

According to a further feature of the present invention, the angle is about 90°.

According to a further feature of the present invention, the first face is ruled with one or more additional diffraction grating.

There is also provided, according to the teachings of the present invention, a device for simultaneously determining the direction and wavelength of an incident light beam, the device comprising: (a) a diffraction grating located in a first plane for diffracting the incident light beam to produce a plurality of diffracted beams; (b) an optical system for focusing the diffracted beams at a second plane parallel to the first plane; (c) a two-dimensional detector array located substantially at the second plane, the two-dimensional detector array generating an output indicative of positions of intersection of the diffracted beams with the second plane; and (d) a processor for processing the output to determine the direction and wavelength of the incident light beam.

There is also provided, according to a further feature of the present invention, a device for simultaneously determining the direction and wavelength of an incident light beam, the device comprising: (a) a transparent block having a first face and a second face; (b) a holographic image associated with the first face for diffracting the incident light beam to produce, a plurality of diffracted beams within the transparent block; (c) a detector array attached to the second face, the detector array generating an output indicative of positions of intersection of the diffracted beams with the second face; and (d) a processor for processing the output to determine the direction and wavelength of the incident light beam.

According to a further feature of the present invention, the holographic image additionally functions to focus the incident light beam.

According to a further feature of the present invention, the holographic image is an image of an object approximating to a point source.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of devices for simultaneously determining the direction and wavelength of an incident monochromatic light beam.

The principles and operation of devices according to the present invention may be better understood with reference to the drawings and the accompanying description.

Figure 1:
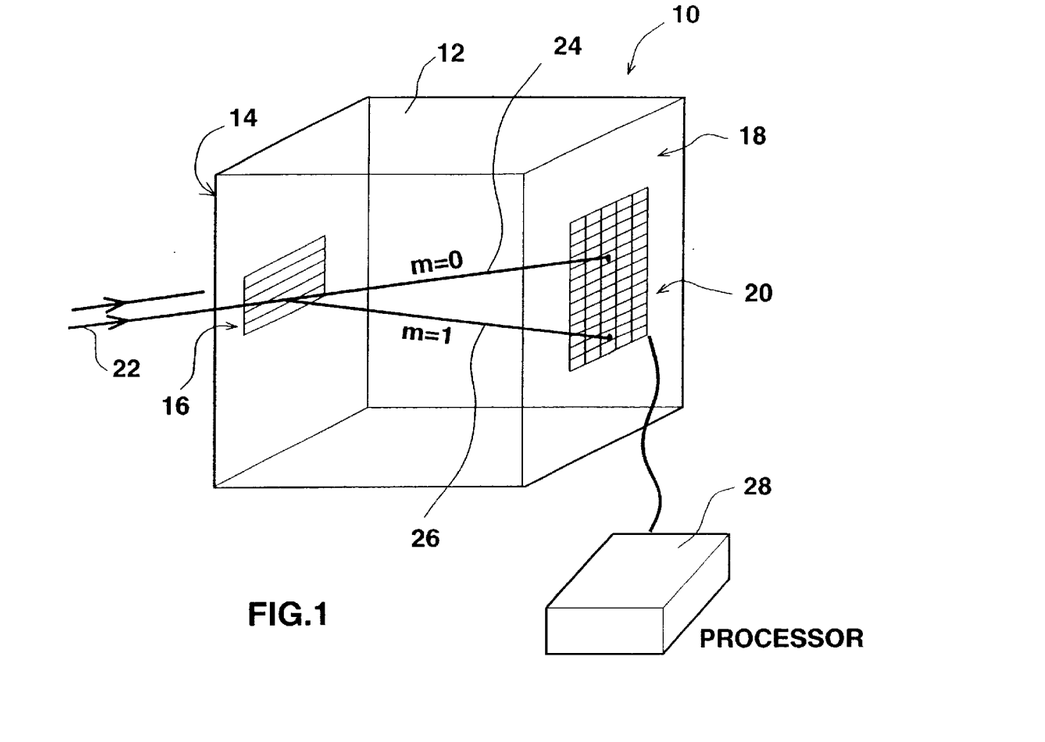
FIG. 1 is a schematic perspective view of a first embodiment of a spectral analyzer and direction indicator constructed and operative according to the teachings of the present invention.

Referring now to the drawings, FIG. 1 shows a first embodiment of a device, generally designated 10, constructed and operative according to the teachings of the present invention, for simultaneously determining the direction and wavelength of an incident light beam. Generally speaking, device 10 includes a transparent block 12 having a first face 14 provided with a diffraction grating 16 and a second face 18 provided with a detector array 20. An incident light beam 22 is diffracted by diffraction grating 16 to produce a plurality of diffracted beams 24, 26 within transparent block 12. Detector array 20 generates an output indicative of positions of intersection of diffracted beams 24, 26 with second face 18. This output is then supplied to a processor 28 which processes the output to determine the direction and wavelength of incident light beam 22. This information may then be displayed to a user, stored for future reference, or output in any other form to a remote location or remote device.

Device 10 has a monolithic structure, meaning that all the optical components of device 10 are assembled as a single block. This ensures a constant alignment and spacing between all the components. The use of transparent block 12 as a propagation medium is also advantageous, serving both to reduce the dimensions of device 10 and to guarantee refractive trapping of incident beams from a very wide field of view (FOV).

The term "light" in the context of the present invention is to be interpreted in a wide sense to include electromagnetic radiation from ultraviolet wavelengths up to those of infrared and beyond. While the principles of the present invention are equally applicable to a very wide range of wavelengths of electromagnetic radiation, the choice of materials and the dimensions of devices constructed according to these principles will vary considerably according to the intended application.

By way of example, the present invention will be described with reference to devices for use with a range of wavelengths encompassing most common laser sources (from about 1.5 to about 0.35 $\mu$m). Adaptation for use with other ranges of wavelengths may be readily performed by one familiar with design of optical systems.

The devices of the present invention are particularly valuable in a wide range of applications due to their ability to simultaneously perform three different functions: to positively identify incident radiation as laser-type radiation; to determine the wavelength of the radiation; and to determine the incident direction of the radiation. Examples of applications to which the present invention is highly suited include, but are not limited to, detection of laser light used in rangefinders and targeting systems, detection of harmful laser radiation in both defence and industrial applications, laser spectroscopy, simulators based on beamed lasers, and in the field of entertainments for various types of laser-based games.

Figure 2:
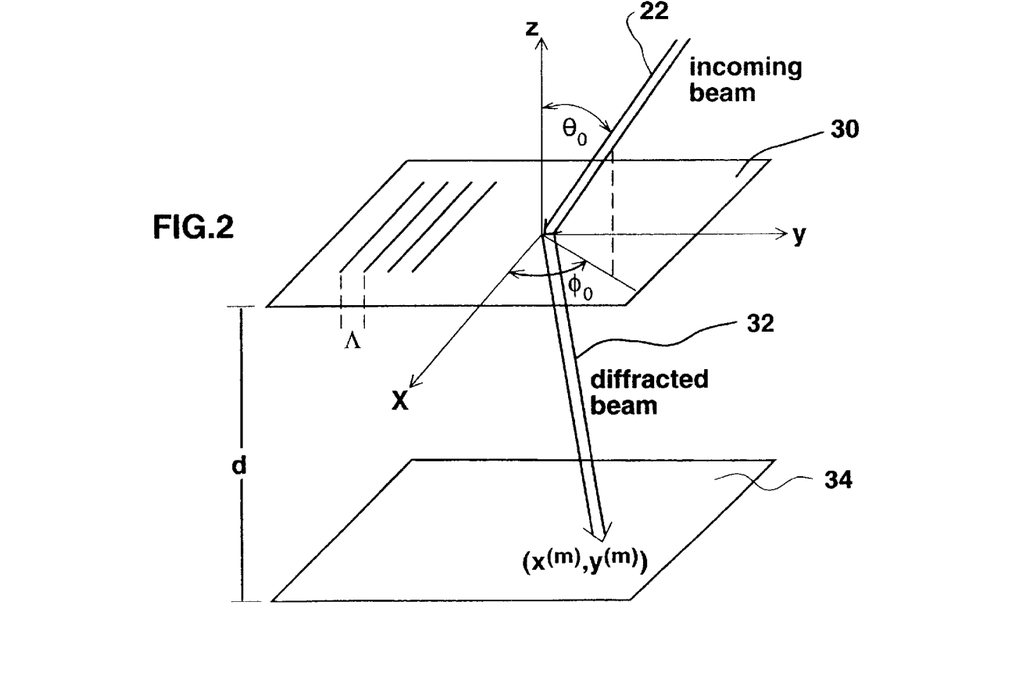
FIG. 2 is a schematic illustration of the geometry of diffraction of an incident light beam showing the parameters and sign conventions used in describing the spectral analyzer and direction indicators of the present invention.

The principles used to analyze the output of detector array 20 will now be described with reference to FIG. 2. FIG. 2 shows incident light beam 22 of wavelength λ arriving at a diffraction grating which lies in a first plane 30. Incident light beam 22 is then diffracted by the grating to produce a number of diffracted beams, one of which is represented here as beam 32. Beam 32 intersects a second plane 34, parallel to first plane 30 and displaced therefrom by a distance d. In the case of the first embodiment of the present invention, first plane 30 corresponds to first face 14 and second plane 34 corresponds to second face 18. The respective refractive indices of the propagation media for incident light beam 22 and diffracted beam 32 are denoted $n_0$ and $n_1$. The period of the grating is denoted Λ.

For the purposes of this description, reference will be made to a rectilinear coordinate frame herein defined to have its origin at the intersection of incident light beam 22 with first plane 30, an X-axis parallel to the lines of the grating, a Y-axis perpendicular to the lines of the grating but parallel to first plane 30, and a Z-axis perpendicular to first plane 30. The direction of incident light beam 22 may then be described uniquely by a combination of the angle $\theta_0$ subtended by incident light beam 22 to the Z-axis and the angle $\phi_0$ between the X-axis and the projection of incident light beam 22 on to first plane as shown. By the same conventions, the direction of each diffracted beam 32 is described by angles $\theta_1^{(m)}$ and $\phi_1^{(m)}$ where m is the order of the diffracted beam (0, ±1, ±2, etc.).

The position of diffracted beam 32 reaching second plane 34 is denoted by its coordinates $(x^{(m)}, y^{(m)})$. In order to determine the direction and wavelength of incident light beam 22, the coordinates of a number of diffracted beams 32 are identified from the output of a detector array located in second plane 34. These coordinates are then used to determine the directions of diffracted beams 32, which are in turn substituted into the diffraction equations and solved to recover directional and wavelength information about incident light beam 22.

Relating now to each step of the calculations in turn, the coordinates of each diffracted beam 32 are related to its angular direction by the following equations:

$$x^{(m)} = d \tan \theta_1^{(m)} \cos \phi_1^{(m)} \quad (1)$$

$$y^{(m)} = d \tan \theta_1^{(m)} \sin \phi_1^{(m)} \quad (2)$$

Inverting these equations, $\theta_1^{(m)}$ and $\phi_1^{(m)}$ may be completely and uniquely determined by use of the equations:

$$\tan \theta_1^{(m)} = \frac{\sqrt{(x^{(m)})^2 + (y^{(m)})^2}}{d} \quad (3)$$

$$\cos \phi_1^{(m)} = \frac{x^{(m)}}{d \tan \theta_1^{(m)}} \quad (4)$$

$$\sin \phi_1^{(m)} = \frac{y^{(m)}}{d \tan \theta_1^{(m)}} \quad (5)$$

In an ideal analysis, assuming an infinite grating size and a monochromatic light source, the angles of the incident and diffracted beams are related through the laws of diffraction and refractive effects according to the following equations:

$$\tan \phi_1^{(m)} = \tan \phi_0 + \frac{m\lambda}{\Lambda \sin \theta_0 \cos \phi_0} \quad (6)$$

$$\sin \theta_1^{(m)} = \frac{n_0}{n_1} \sin \theta_0 \frac{\cos \phi_0}{\cos \phi_1^{(m)}} \quad (7)$$

where m=0, ±1, ±2, ±3, etc.

For each order of diffracted beam 32, substituting in the values of $\theta_1^{(m)}$ and $\phi_1^{(m)}$ from equations (3), (4) and (5) into equations (6) and (7) gives two equations with three unknowns. Thus measurements of two orders of diffraction are sufficient to recover a complete set of information including λ, $\theta_0$ and $\phi_0$. There is generally also redundancy in the information, especially where more than two orders of diffraction are obtained. Redundant information can be used for additional checking or error reduction.

In the particular case that one of the diffracted beams detected is the zero diffraction order, recovery of the parameters is particularly simple. In this case, the aforementioned substitution into equations (6) and (7) gives the angular direction of incident light beam 22 as follows:

$$\tan \phi_0 = \tan \phi_1^{(0)} = \frac{y^{(0)}}{x^{(0)}} \quad (8)$$

$$\sin \theta_0 = \frac{n_1}{n_0} \sin \left( \tan^{-1} \frac{\sqrt{(x^{(0)})^2 + (y^{(0)})^2}}{d} \right) \quad (9)$$

If in addition, one diffracted beam of order m≠0 is detected, the wavelength λ of incident light beam 22 is immediately recovered by substituting $\phi_1^{(m)}$ into equation (6).

The order of each diffracted beam is determined by its intensity relative to the other detected beams. The exact amplitude ratios of the different diffracted beams correspond to the coefficients of the Fourier series expansion of the gratings periodic transmission functions. Practically, these ratios are most easily determined by performing an initial calibration of device 10 using a light source of known direction and wavelength.

Although the case where the zero-order beam is detected is particularly simple, any case in which at least two diffracted beams are measured is also completely soluble. In the general case, the equations are solved algebraically or numerically, as appropriate.

It will be readily appreciated that device 10 intrinsically provides a highly effective way of distinguishing between a monochromatic source, such as a laser, and a non-monochromatic source. In quantitative terms, a finite wavelength range Δλ of incident light beam 22 generates a spread in angle of diffracted beam 32 given by:

$$\Delta(\tan\phi_1^{(m)}) = \frac{m\Delta\lambda}{\Lambda\sin\theta\cos\phi_0} \quad (10)$$

with a corresponding variation in angle $\phi_1^{(m)}$.

Thus, measurement of a spread of position coordinates of the detected signals indicates a non-monochromatic source. The extent of spreading used as the criteria for classifying a source as monochromatic is set at a reasonable level according to the resolution limitations of device 10, as will be described below.

The limitations on the resolution achieved with device 10 depend primarily on the effects of the finite size of diffraction grating 16. The size and shape of the aperture of diffraction grating 16 determine the size and shape of the diffracted beam arriving at second plane 34. For example, if the aperture of the grating is apodized according to a Gaussian function, the spot size at the detection plane is given by:

$$\omega_0(\|) = \omega_0 \sqrt{1 + \left(\frac{\lambda d}{\pi\omega_0^2(\cos\theta_1^{(m)})^3}\right)^2} \quad (11)$$

$$\omega_0(\perp) = \omega_0 \sqrt{1 + \left(\frac{\lambda d}{\pi\omega_0^2(\cos\theta_1^{(m)})}\right)^2} \quad (12)$$

where $\omega_0$ is the width parameter of the aperture function at the grating plane, and $\|$ and $\perp$ refer to directions parallel and perpendicular to the direction of the plane of incidence of the rays.

Thus, device 10 is sensitive to identify radiation as non-monochromatic if it has a wavelength bandwidth $\Delta\lambda$ which, according to equation (10), causes point spreading on second face 18 significantly greater than $\omega_d(\|)$ and $\omega_d(\perp)$.

Turning now more specifically to the features of device 10, transparent block 12 is typically cuboid, although other shapes with first face 14 parallel to second face 18 may be used. Typically, each dimension of transparent block 12 is in the range 3–12 mm. Alternatively, a device optically and functionally equivalent to device 10 as shown uses a transparent block in the form of a triangular prism in which a virtual reflected image of second face 18 is parallel to first face 14, while the physical second face 18 is actually adjacent to first face 14.

Transparent block 12 may be made from any generally transparent rigid material including, but not limited to, glass, quartz and plastics. The use of materials with a high refractive index is beneficial since the refractive effects help to trap incident light beams from a very wide range of angles. For example, use of glass of refractive index $n_1 \approx 1.5$ ensures that $\theta_1^{(0)} < 42°$. Thus, by locating diffraction grating 16 near the center of first face 14 and ensuring that the dimensions of detector array 20 on second face 18 are about twice the separation d between first face 14 and second face 18, device 10 will detect the zero diffraction order beam from any incident beam in a field of view approximating to $2\pi$ a steradians.

In this embodiment of the present invention, internal reflection of diffracted beams 24, 26 from the lateral faces of transparent block 12 is generally undesirable. Such reflections are preferably prevented by grinding the lateral faces of transparent block 12 so as to diffuse any light striking them. Alternatively, other techniques may be used, such as the impregnation of the material of transparent block 12 adjacent to its lateral faces with absorptive pigments.

Diffraction grating 16 is formed or deposited on, or attached to, first face 14 by any conventional method. Typically, diffraction grating 16 is an amplitude grating with a period of about $\Lambda=1$ $\mu$m, and an aperture of spot-size $\omega_0 \approx 0.06$ mm. Alternatively, a phase grating may be used. The remaining part of first face 14 is covered or painted to prevent unwanted light from reaching detector array 20. The lateral faces of transparent block 12 are also preferably clad with opaque material or painted to prevent light from entering through the sides of transparent block 12.

Detector array 20 is a two-dimensional array, typically of Charge Coupled Device (CCD) type. Suitable detectors include those commonly used in video applications. An example of such a detector is model VVL 1101 produced by VLSI Vision Co. of Edinburgh, U.K., which has an array containing 312×287 elements, each of size 20×16 $\mu$m. Data from this detector is read and processed serially, typically at video rates of 30 frames per second.

Alternatively, an individually addressable detector array may be employed, thereby allowing parallel processing at higher data rates. Individually addressable detectors are commercially available from UDT Sensors Inc. of California, U.S.A.

The various parameters of device 10 may be selected according to the resolution required. Typically, for wavelengths of about 1 $\mu$m and with d=6 mm, $\omega_0 \approx 0.06$ mm, roughly normal incidence and a detector array of 312×287 elements each of size 20×16 $\mu$m, the minimum spot size at second face 18 corresponds to an area of 4×3 elements of detector array 20. The location of the central element, or centroid, may then be identified as the spot position, within an uncertainty of one sensing element. For a grating of period $\Lambda=1$ $\mu$m, this corresponds to a wavelength resolution of 10 nm or better. The corresponding angular resolution is typically about 0.8°.

At highly oblique angles of incidence, the size and shape of the minimum diffraction spot change. Processor 28 may advantageously be pre-programmed or calibrated with the diffraction spot size and shape for different angles of incidence, and may additionally, or alternatively, use weighted or otherwise adapted techniques for selection of the centroid of each spot, thereby minimizing any loss of resolution at high angles.

Detector array 20 is attached to second face 18 by any suitable means. Optical bonding techniques may be used to advantage, particularly in low-intensity applications or when attenuation is used.

When device 10 is used for detecting and analyzing collimated, or near-collimated, laser radiation, the intensity of the laser radiation will generally far exceed ambient radiation levels. Thus, simple threshold image processing techniques are sufficient to pick out a diffraction pattern due to the laser radiation. However, in applications in which a high intensity of ambient light, such as sunlight, is expected, there exists a possibility of detector array 20 being "blinded" through saturation. This may be avoided by adding an attenuator plate (not shown) in front of diffraction grating 16.

The output of detector array 20 is indicative of the positions of diffracted beams 24, 26 measured in two-dimensions on second face 18. This output is then transferred to processor 28. Processor 28 is typically an all-purpose microprocessor provided with appropriate software to perform the calculations required, as described above. Alternatively, a purpose built processor or any other type of processor may be used.

Processor 28 continuously samples or monitors the output of detector array 20 and performs the image processing necessary to detect localized signals which are indicative of the presence of monochromatic radiation. Processor 28 then analyzes these signals to determine whether the source of the radiation is of laser type. This is done by identification of the different diffraction orders and analyzing the extent of concurrence between the detected spot sizes and positions, and those predicted by equations (1)–(12). The zero order diffraction spot is generally easily identified as the spot of maximum intensity. The indices of the remaining spots may then be assigned ascending sequentially, according to some convention such as that illustrated in FIG. 1. Processor 28 also calculates the wavelength and direction of the incident beam. Processor 28 may perform the calculations directly and/or by reference to look-up tables, as appropriate. The information is then be displayed on a video or other user interface (not shown), and/or supplied directly to other instruments or devices intended to utilize the information.

Diffraction grating 16 may optionally be replaced by a cross-ruled diffraction grating (not shown), or supplemented by an adjacent or superposed diffraction grating with lines ruled perpendicular to those of diffraction grating 16. These configurations provide additional sets of diffraction spots, thereby providing additional information for cross-checking and/or error reduction.

Figure 3A:
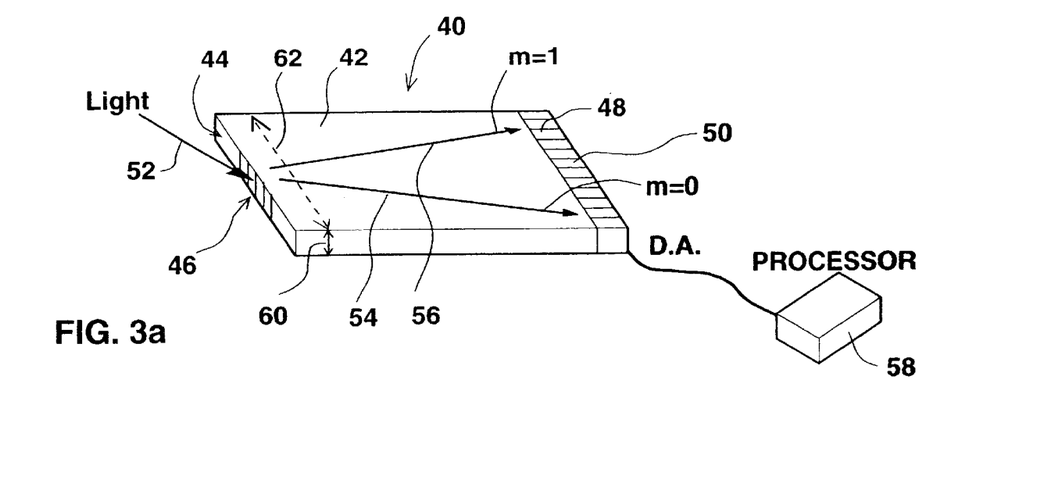
FIG. 3A is a schematic perspective view of a second embodiment of a spectral analyzer and direction indicator constructed and operative according to the teachings of the present invention.
Figure 3B:
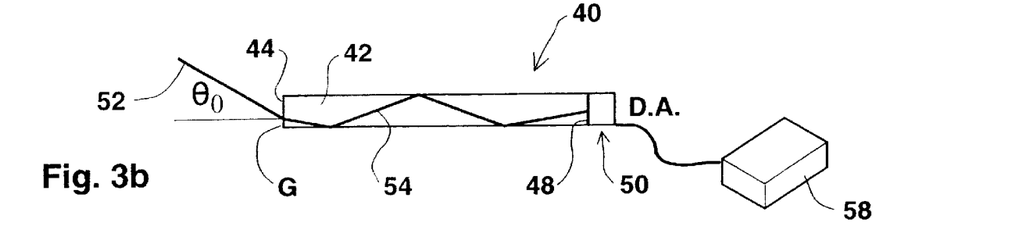
FIG. 3B is a schematic side view of the spectral analyzer and direction indicator of FIG. 3A.
Figure 4:
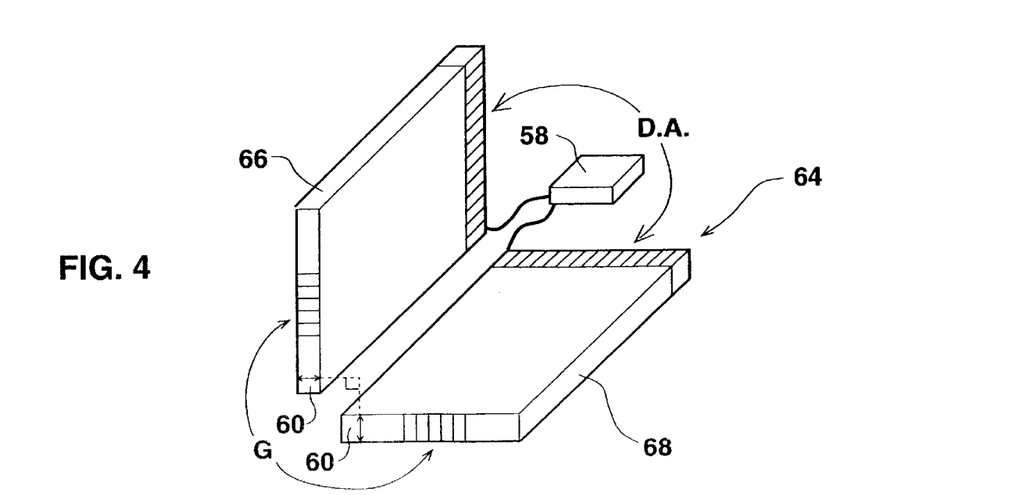
FIG. 4 is a schematic perspective view of a system using two of the spectral analyzer and direction indicators of FIG. 3A.

With reference to FIGS. 3A, 3B and 4, a second embodiment of the present invention will now be described. FIGS. 3A and 3B show a second embodiment of a device, generally designated 40, constructed and operative according to the teachings of the present invention, for simultaneously determining the direction and wavelength of an incident light beam. Generally speaking, device 40 is a flattened equivalent to device 10, providing wavelength and directional information relative to the plane of device 40. Accordingly, device 40 includes a transparent block 42, alternatively referred to as slab 42, having a first face 44 provided with a diffraction grating 46 and a second face 48 provided with a detector array 50. An incident light beam 52 is diffracted by diffraction grating 46 to produce a plurality of diffracted beams 54, 56 within slab 42. Detector array 50 generates an output indicative of positions of intersection of diffracted beams 54, 56 with second face 48. This output is then supplied to a processor 58 which processes the output to generate information relating to the direction and wavelength of incident light beam 52.

Slab 42 has a first dimension 60 parallel to lines of diffraction grating 46 and a second dimension 62 perpendicular to the lines and parallel to first face 44, first dimension 60 being significantly smaller than second dimension 62. Slab 52 functions as an optical waveguide with respect to first dimension 60. In other words, light entering slab 42 through first face 44 undergoes total internal reflection at the faces perpendicular to first dimension 60. If slab 42 is made out of glass, or any other material with a refractive index greater than √2, incident light beam 52 will be trapped within this waveguide independent of its angle of incidence within a hemisphere of 2 π steradians. This internal reflection causes a loss of the information in diffracted beams 54, 56 relating to first dimension 60 while maintaining the information relating to second dimension 62. Detector array 50 is a one-dimensional array located-so as to measure position on second face 48 along second dimension 62.

It will be appreciated that, in the context of the present embodiment, the terms "position" and "direction" refer to position and direction in a plane perpendicular to first dimension 60. Thus, detector array 50 detects the position of diffracted beams 54, 56 in second dimension 62, and processor 58 processes the output of detector array 50 to recover information about the components of the wavelength and direction of incident light beam 52 perpendicular to first dimension 60.

Structurally, device 40 is analogous to device 10 in choice of materials and construction. Typical dimensions for slab 42 are 3–10 mm wide (second dimension 62), 0.1–0.2 mm thick (first dimension 60) and 3–10 mm long (distance d between first face 44 and second face 48). Device 40 therefore combines a highly compact design with a field of view of up to 2 π steradians. Detector array 50 is a one-dimensional array, thereby allowing high resolution at a much lower production cost than devices using two-dimensional detector arrays.

A suitable method must be used for placement of diffraction grating 44 on first face 42 since many common techniques cannot be used for placement on an edge of a slab. One suitable method is evaporation of a photosensitive film at the surface of first face 42 followed by holographic writing of a grating. Another suitable method is contact with an amplitude or phase external mask.

The output of detector array 50 contains information corresponding to the $y^{(m)}$ coordinate only of each diffracted beam 54, 56 as defined with reference to FIG. 2 above. In order to recover complete information about the wavelength and direction of incident light beam 52 in three dimensions, two slabs 42 must be used. A single slab 42 may be useful when additional a priori information is available. For example, in a ground-based warfare situation, all sources will lie roughly in a horizontal plane, and one can then assume $\phi_0 \approx 90°$. Corresponding approximate values of λ and $\theta_0$ may then be recovered from device 40 containing a single slab 42.

FIG. 4 shows a system, generally designated 64, which uses two slabs 66, 68 to simultaneously determine the direction and wavelength of an incident light beam. Slabs 66 and 68 are each equivalent to slab 42, and are positioned such that first dimension 60 of slab 66 is rotated by 90° from first dimension 60 of slab 68. This orthogonal arrangement ensures that association of the output measurements of detector arrays 50 of slabs 66 and 68 contain complete directional and spectral information about the incident light beam.

The exact form of the information, and hence the details of the calculations performed by processor 58, differ somewhat from those of device 10. In contrast to the $(x^{(m)}, y^{(m)})$ coordinate information output from detector array 20, slab 66 produces $y^{(m)}$ coordinate information denoted $y^{(m)}$, and slab 68 produces the corresponding $y^{(m)}$ coordinate information, but with $\phi_0$ replaced by $\phi_0 + 90°$, denoted $y'^{(m)}$. Substitution of these coordinates back into Equation (2) allows the angles of the diffracted beams to be recovered, and hence those of the incident beam. The wavelength is then recovered from Equation (6).

Alternatively, slabs 66 and 68 may be positioned at other angles relative to each other. In principle, complete wavelength and direction information may be recovered from any two non-parallel slabs, i.e., so long as first dimensions 60 of slabs 66 and 68 are non-parallel. In practice, to achieve high resolution, first dimension 60 of slab 66 is preferably rotated from first dimension 60 of slab 68 by an angle of between about 30° and about 150°. The equations relating $\theta_1^{(m)}$ and $\phi_1^{(m)}$ to coordinates $y^{(m)}$ and $y'^{(m)}$ must be revised according to the geometry used.

Figure 5A:
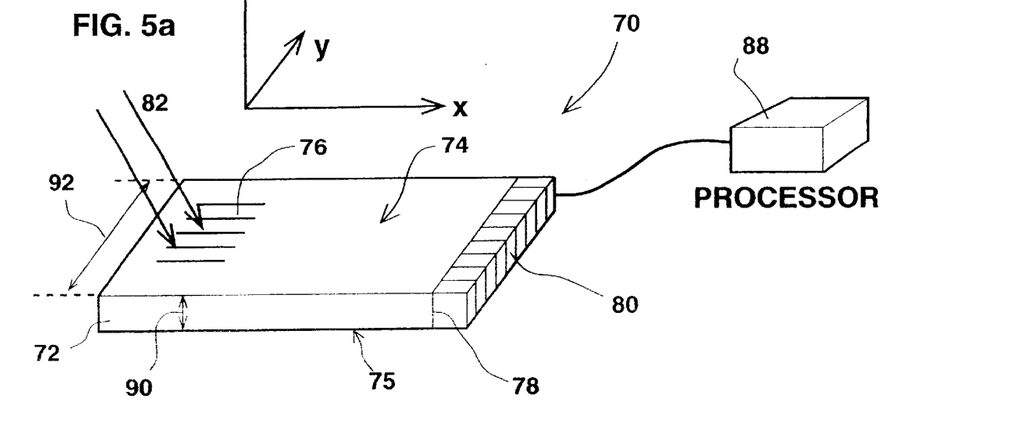
FIG. 5A is a schematic perspective view of a third embodiment of a spectral analyzer and direction indicator constructed and operative according to the teachings of the present invention.
Figure 5B:
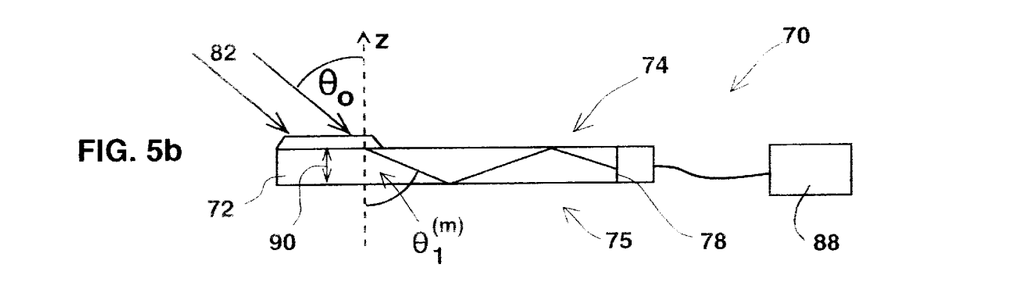
FIG. 5B is a schematic side view of the spectral analyzer and direction indicator of FIG. 5A.
Figure 5C:
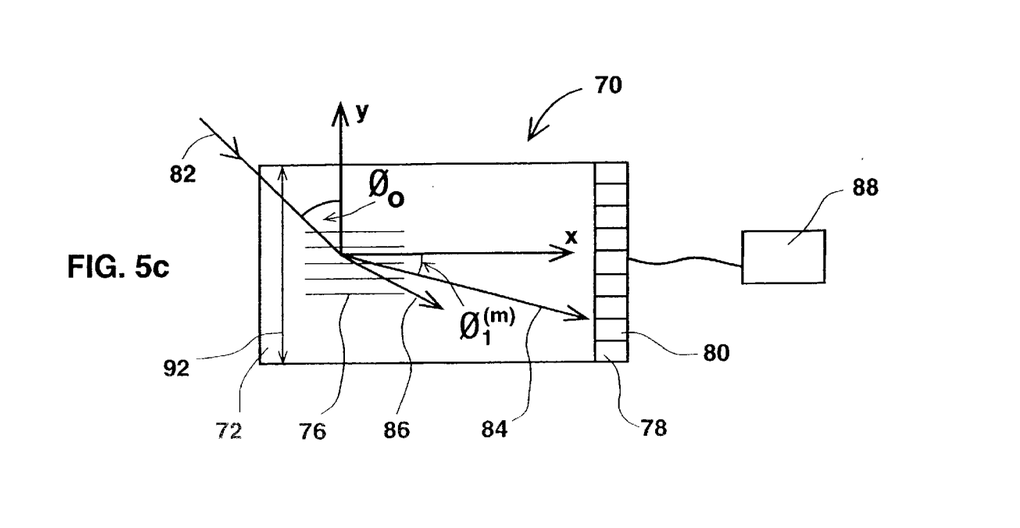
FIG. 5C is a schematic top view of the spectral analyzer and direction indicator of FIG. 5A.

With reference to FIGS. 5A, 5B and 5C, a third embodiment of the present invention will now be described. FIGS. 5A, 5B and 5C show a third embodiment of a device, generally designated 70, constructed and operative according to the teachings of the present invention, for simultaneously determining the direction and wavelength of an incident light beam. Generally speaking, device 70 is similar to device 40, but has a diffraction grating and a detector array on adjacent surfaces of a transparent block. Accordingly, device 70 includes a transparent block 72, alternatively referred to as slab 72, having a first face 74 provided with a diffraction grating 76 and a second face 78, adjacent to first face 74, provided with a detector array 80. A third face 75 is opposite and parallel to first face 74. An incident light beam 82 is diffracted by diffraction grating 76 to produce a plurality of diffracted beams 84, 86 within slab 72. Detector array 80 generates an output indicative of positions of intersection of diffracted beams 84, 86 with second face 78. This output is then supplied to a processor 88 which processes the output to generate information relating to the direction and wavelength of incident light beam 82.

According to the conventions established in FIG. 2, the X-axis is defined parallel to the lines of the grating and perpendicular to second face 78, the Y-axis is defined perpendicular to the lines of the grating but parallel to both first face 74 and second face 78, and the Z-axis is defined perpendicular to first face 74. Slab 72 has a first dimension 90 perpendicular to first face 74, i.e., measured along the Z-axis, and a second dimension 92 parallel to both first face 74 and second face 78, i.e., measured along the Y-axis, first dimension 90 being significantly smaller than second dimension 92.

In order to trap diffracted beams 84, 86 within slab 72, third face 75 and first face 74, other than the area of the grating, are preferably coated with a reflective coating. In this way, beams incident from a wide range of angles will be reflected repeatedly between first and second faces 74, 75 until reaching second face 78 where they will be detected by detector array 80.

This embodiment has a number of structural advantages, combining the compact design of device 40 with an easily deposited slab-top grating position.

In this case, the interrelation of the angular components of the diffracted beams to the measured coordinates differs from that given in equations (1) and (2). Specifically, if the distance from diffraction grating 76 (assumed small) to second face 78 is denoted L, the fixed parameter here is $x^{(m)} = L$ for all diffracted beams, and the remaining coordinates for a beam of order m are given by:

$$y^{(m)} = L \tan(\theta_1^{(m)}) \quad (13)$$

$$z^{(m)} = \frac{L}{\tan\theta_1^{(m)} \cos\phi_1^{(m)}} \quad (14)$$

Each diffracted beam 84, 86 provides only one coordinate, namely, $y^{(m)}$. Thus, the angle $\phi_1^{(m)}$ is immediately recovered from measurements of $y^{(m)}$, but no direct indication of $\theta_1^{(m)}$ is available. By substitution of measurements from two properly identified diffraction orders into equation (6), tan ($\phi_0$) and $\lambda/\sin(\theta_0)$ can be recovered. In order to separate $\lambda$ from $\theta_0$, a second slab 72 with its first face 74 at a different orientation is required. For example, if a second slab 72 is rotated through an angle $\alpha$ about the X-axis relative to a first slab, the coordinate transformation is given by:

$$x' = x, \; y' = -z \sin\alpha + y \cos\alpha, \; z' = z \cos\alpha + y \sin\alpha \quad (15)$$

Thus, when two slabs are used, one rotated about the X-axis relative to the other, the expressions for the single coordinate measured by each are:

$$y^{(m)} = L \tan(\theta_1^{(m)}) \quad (16)$$

$$y'^{(m)} = -\frac{L}{\tan\theta_1^{(m)} \cos\phi_1^{(m)}} \sin\alpha + y^{(m)} \cos\alpha \quad (17)$$

Since $y^{(m)}$ and $y'^{(m)}$ are measured, and L and $\alpha$ are known, the angles $\phi_1^{(m)}$ and $\theta_1^{(m)}$ are readily retrieved. These angle are defined in the original (non-primed) frame of reference. The FOV of the two-slab device is somewhat smaller than that of the previously described embodiments, but still acceptably wide. The angle of rotation, $\alpha$, is preferably between about 90° and about 150°.

Figure 6A:
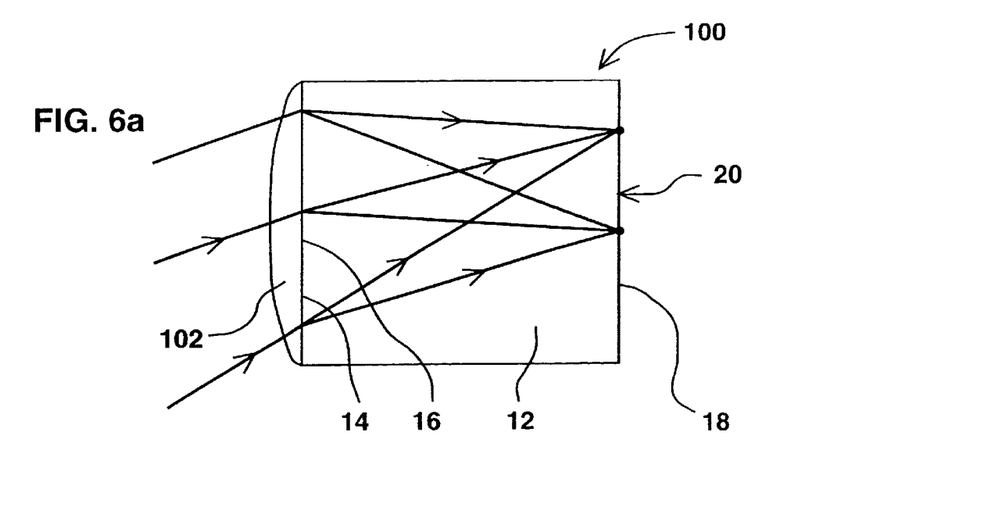
FIG. 6A is a schematic side cross-sectional view of a fourth embodiment of a spectral analyzer and direction indicator, constructed and operative according to the teachings of the present invention, in which collecting optics are used in combination with a transparent block as a transport medium.
Figure 6B:
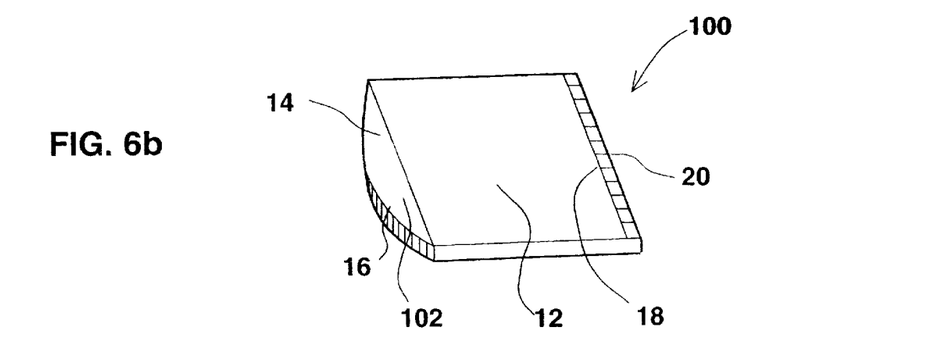
FIG. 6B is a schematic perspective view of a first variant of the embodiment of FIG. 6A, in which collecting optics are used with a slab-type solid transport medium.
Figure 6C:
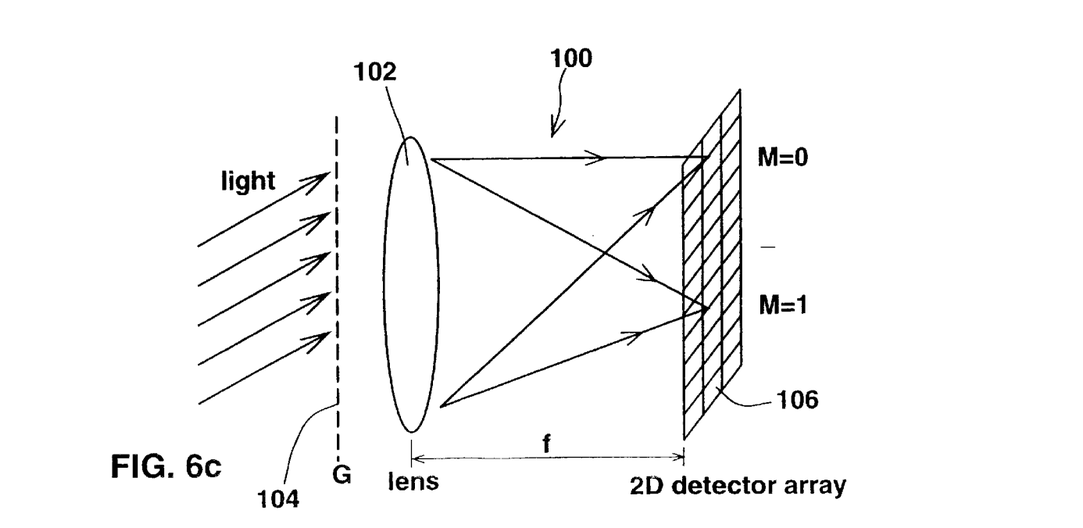
FIG. 6C is a schematic perspective view of a second variant of the embodiment of FIG. 6A, in which collecting optics are used without a solid transport medium.

With reference to FIGS. 6A, 6B and 6C, a fourth embodiment of the present invention will now be described. FIGS. 6A, 6B and 6C show a fourth embodiment of a device, generally designated 100, constructed and operative according to the teachings of the present invention, for simultaneously determining the direction and wavelength of an incident light beam. Generally speaking, device 100 is similar in principle to device 10, but uses collecting optics represented by lens 102 as an alternative, or addition, to transparent block 12. Diffraction grating 104 is preferably a large area grating.

The previously described embodiments of the present invention are constructed on the assumption that the laser radiation of interest is of significantly higher intensity than any other light sources in the surroundings. This assumption is valid for a range of scenarios including detection of any potentially harmful laser radiation in a battlefield environment, as well as for experimental measurements in a laboratory setting. However, in various other scenarios, such as when lasers are used in targeting or ranging applications, this assumption is no longer valid. For such cases, the present embodiment provides a much more sensitive and selective device.

FIGS. 6A and 6B shows forms of device 100 when transparent block 12 is used. Elements equivalent to those of device 10 are labelled similarly. In this case, lens 102 is formed with a planar rear surface, and is bonded optically transparently to first face 14. Alternatively, transparent block 12, itself, may be spherically ground so that lens 102 is integrally formed with first face 14. It should be noted that the term "cuboid" as used herein, in the specification and claims, is taken to mean substantially cuboid. Hence, for example, a transparent block having one or more faces ground as a lens may be described as cuboid.

FIG. 6C shows the form of device 100 when transparent block 12 is not used. In this case, a diffraction grating 104 and a detector array 106 are independently arranged in parallel planes with diffraction grating 104 positioned close to lens 102.

Detector array 106 is positioned at the focal plane of lens 102. For a parallel incoming beam or plane wave-front, the coordinates of the detected spot due to a diffracted beam are then given by:

$$x_1^{(m)} = f \tan\theta_1^{(m)} \cos\phi_1^{(m)} \quad (18)$$

$$y_1^{(m)} = f \tan\phi_1^{(m)} \sin\phi_1^{(m)} \quad (19)$$

where f is the focal length of the lens. The numerical aperture or acceptance angle will be determined here by the light collecting optics. By enlarging the aperture and dimensions of the system, the entire light beam incident from a certain direction falling on the lens aperture can be focused into a single element of detector array 106, so that the resolution of device 100 is limited only by the size of a single pixel. This property of focusing all the incident laser radiation in each diffracted order to a point produces sufficient intensity variations to identify even weak signals against high ambient light intensity levels.

Figure 7:
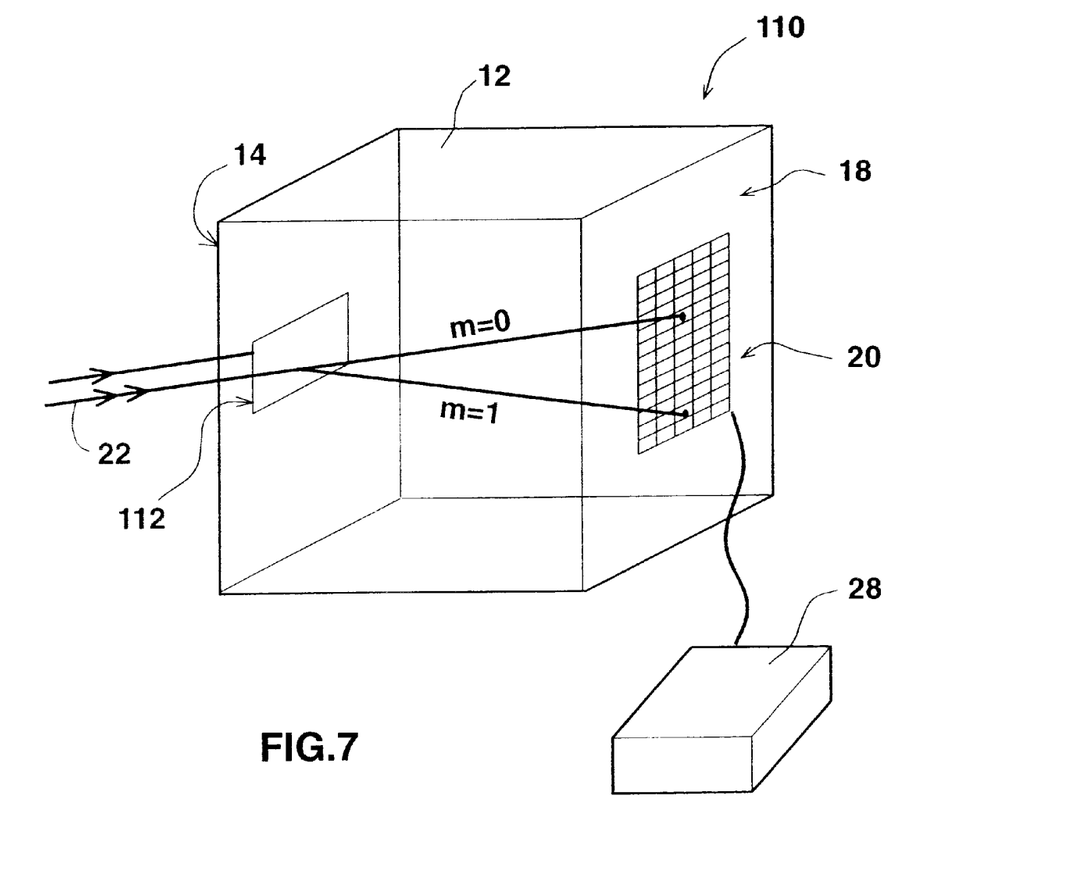
FIG. 7 is a schematic perspective view of a fifth embodiment of a spectral analyzer and direction indicator constructed and operative according to the teachings of the present invention.

Finally, with reference to FIGS. 7 and 8, a fifth embodiment of the present invention will now be described. FIG. 7 shows a fifth embodiment of a device, generally designated 110, constructed and operative according to the teachings of the present invention, for simultaneously determining the direction and wavelength of an incident light beam. Generally speaking, device 110 is similar to device 10, equivalent elements being designated similarly. Device 110 differs from device 10 in that diffraction grating 16 is replaced by a more complex interference pattern or holographic image 112.

In one possible holographic approach the action of lensing or light collection, coupling into the propagating medium and wavelength selectivity can be achieved within an holographic pattern. Indeed, the hologram of a point source object recorded with a point source reference wave, will act as a lens, in which the focal point will depend, in addition to the parameters of the recording source, on the parameters of the reconstructing source, i.e., the direction and wavelength of the incident light beam.

Figure 8A:
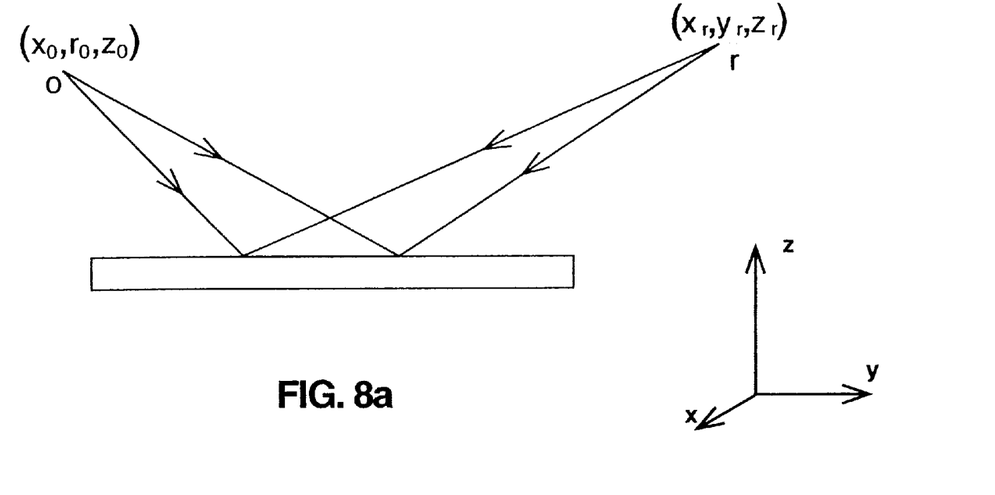
FIGS. 8A and 8B are schematic side views illustrating the operational principles of the fifth embodiment of a spectral analyzer and direction indicator constructed and operative according to the teachings of the present invention.
Figure 8B:
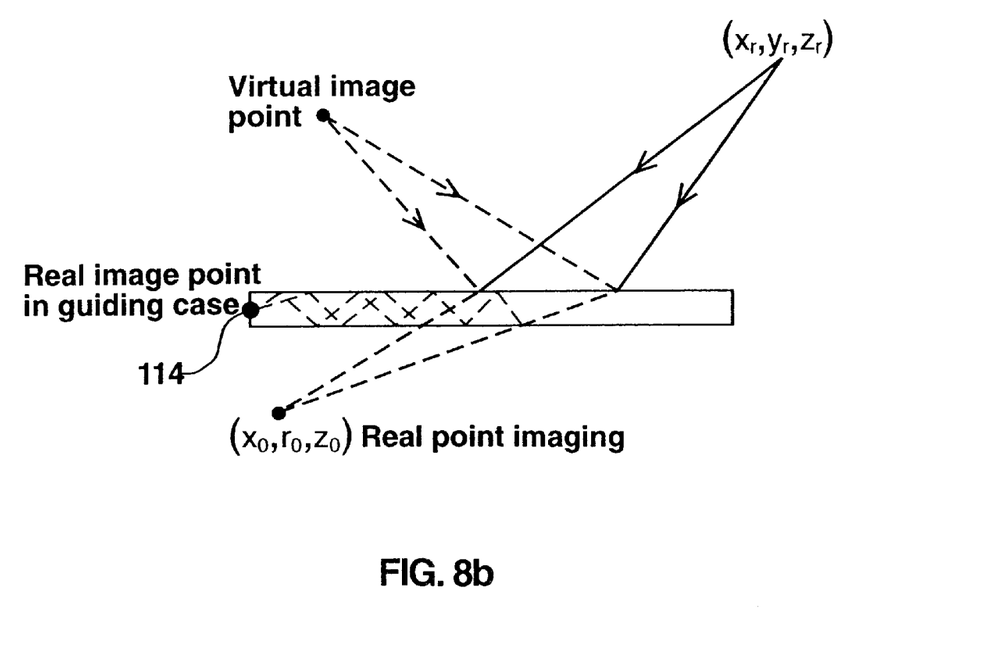

Using the terminology shown in FIGS. 8A and 8B, if holographic image 112 is recorded with a point source recording reference at $(x_r, y_r, z_r)$ and a point source object at $(x_0, y_0, z_0)$ using light of wavelength $\lambda$, and reconstructed with a point source recording reference at $(x'_r, y'_r, z'_r)$ using light of wavelength $\lambda'$, the coordinates of reconstructed point image $(x'_0, y'_0, z'_0)$ are given by:

$$x'_0 = \frac{\lambda'}{\lambda}\left(-\frac{z'_0}{z_r}x_r + \frac{z'_0}{z_0}x_0\right) - \frac{z'_0}{z'_r}x'_r \quad (20)$$

$$y'_0 = \frac{\lambda'}{\lambda}\left(-\frac{z'_0}{z_r}y_r + \frac{z'_0}{z_0}y_0\right) - \frac{z'_0}{z'_r}y'_r \quad (21)$$

$$\frac{1}{z'_0} = \frac{\lambda'}{\lambda}\left(-\frac{1}{z_0} + \frac{1}{z_r}\right) + \frac{1}{z'_r} \quad (22)$$

A practical implementation of this embodiment may use plane waves for both the recording and reconstructing reference beams. In this case, the individual coordinates of the effective reference beam point sources in equations (20) to (22) each tend to infinity while the directions of these beams are defined in terms of the ratios:

$$\frac{x_r}{z_r} \to \xi_r, \frac{y_r}{z_r} \to \eta_r, \frac{x'_r}{z'_r} \to \xi'_r, \frac{y'_r}{z'_r} \to \eta'_r \quad (23)$$

These parameters are related to the polar angles of the reference beams as follows:

$$\xi_r = \tan\theta_r \cos\phi_r, \eta_r = \tan\theta_r \sin\phi_r \quad (24)$$

$$\xi'_r = \tan\theta_{r'}\cos\phi_{r'}, \eta'_r = \tan\theta_{r'}\sin\phi_{r'} \quad (25)$$

In these terms, the position of the reconstructed image point will be given by:

$$x'_0 = z'_0\left(\xi_r - \frac{x_0}{z_0}\right) - \frac{\lambda}{\lambda'}z_0\xi'_r \quad (26)$$

$$y'_0 = z'_0\left(\eta_r - \frac{y_0}{z_0}\right) - \frac{\lambda}{\lambda'}z_0\eta'_r \quad (27)$$

$$z'_0 = \frac{\lambda}{\lambda'}z_0 \quad (28)$$

Given the frequency dependent properties of the lensing effect of the hologram, this embodiment of the present invention is best suited to applications in which a particular wavelength, or a small range of wavelengths, is of interest. Device 110 is then constructed such that $z'_0$ corresponds to separation d between first face 14 and second face 18. Alternatively, a number of devices "tuned" to different wavelengths may be used together to cover a wide range of wavelengths.

It should be appreciated that the various features of the above embodiments are not intended to be exclusive to those embodiments. For example, the collecting optics described with reference to FIG. 6 and/or the use of a holographic image as described with reference to FIGS. 7 and 8 may be used to advantage with geometrical arrangements similar to those of FIGS. 3–5. The real image point 114 for one case of slab geometry using a holographic approach is illustrated in FIG. 8B.

It will be appreciated that the above descriptions are intended only to serve as examples, and that many other embodiments are possible within the spirit and the scope of the present invention.

What is claimed is:

1. A device for simultaneously determining the direction and wavelength of an incident light beam, the device comprising:
   (a) a transparent block having a first face and a second face;
   (b) a diffraction grating associated with said first face for diffracting the incident light beam to produce a plurality of diffracted beams within said transparent block;
   (c) a detector array associated with said second face, said detector array generating an output indicative of positions of intersection of said diffracted beams with said second face; and
   (d) a processor for processing said output to determine the direction and wavelength of the incident light beam.

2. The device of claim 1, wherein said transparent block is cuboid, said first face being opposite to said second face.

3. The device of claim 2, wherein said detector array is a two-dimensional array, said output being indicative of said positions measured in two-dimensions.

4. The device of claim 3, wherein said diffraction grating includes lines ruled in two directions.

5. The device of claim 2, wherein said transparent block has a first dimension parallel to lines of said diffraction grating and a second dimension perpendicular to said lines and parallel to said second face, said detector array being located so as to measure position on said second face along said second dimension, said first dimension being significantly smaller than said second dimension so that said transparent block functions as an optical waveguide with respect to said first dimension.

6. A system for simultaneously determining the direction and wavelength of an incident light beam, the system comprising:

(a) a first device constructed according to claim 5; and (b) a second device constructed according to claim 5, said first and second devices being positioned such that said first dimension of said transparent block of said second device is rotated by an angle of between about 30° and about 150° from said first dimension of said transparent block of said first device.

7. The system of claim 6, wherein said angle is about 90°.

8. The device of claim 1, wherein said transparent block is cuboid, said first face being adjacent to said second face.

9. The device of claim 8, wherein said transparent block has a first dimension perpendicular to said first face and a second dimension parallel to both said first and said second faces, said detector array being located so as to measure position on said second face along said second dimension, said first dimension being significantly smaller than said second dimension so that said transparent block functions as an optical waveguide with respect to said first dimension for at least one of said diffracted beams.

10. A system for simultaneously determining the direction and wavelength of an incident light beam, the system comprising:

(a) a first device constructed according to claim 9; and (b) a second device constructed according to claim 9, said first and second devices being positioned such that said first dimension of said transparent block of said second device is rotated by an angle of between about 30° and about 150° from said first dimension of said transparent block of said first device.

11. The system of claim 10, wherein said angle is about 90°.

12. The device of claim 8, wherein said first face is ruled with one or more additional diffraction grating.

13. A device for simultaneously determining the direction and wavelength of an incident light beam, the device comprising:

(a) a diffraction grating located in a first plane for diffracting the incident light beam to produce a plurality of diffracted beams;

(b) an optical system for focusing said diffracted beams at a second plane parallel to said first plane;

(c) a two-dimensional detector array located substantially at said second plane, said two-dimensional detector array generating an output indicative of positions of intersection of said diffracted beams with said second plane; and (d) a processor for processing said output to determine the direction and wavelength of the incident light beam.

14. A device for simultaneously determining the direction and wavelength of an incident light beam, the device comprising:

(a) a transparent block having a first face and a second face;

(b) a holographic image associated with said first face for diffracting the incident light beam to produce a plurality of diffracted beams within said transparent block;

(c) a detector array attached to said second face, said detector array generating an output indicative of positions of intersection of said diffracted beams with said second face; and (d) a processor for processing said output to determine the direction and wavelength of the incident light beam.

15. The device of claim 14, wherein said holographic image additionally functions to focus the incident light beam.

16. The device of claim 14, wherein said holographic image is an image of an object approximating to a point source.

* * * * *